(12) United States Patent
Kim

(10) Patent No.: US 7,143,737 B2
(45) Date of Patent: Dec. 5, 2006

(54) ROTARY ENGINE

(76) Inventor: Dong-Hyun Kim, 517-15, Yicheon-dong, Nam-gu, Daegu (KR)

( * ) Notice: Subject to any disclaimer, the term of this patent is extended or adjusted under 35 U.S.C. 154(b) by 0 days.

(21) Appl. No.: 10/527,591

(22) PCT Filed: Sep. 17, 2003

(86) PCT No.: PCT/KR03/01899

§ 371 (c)(1),
(2), (4) Date: Mar. 11, 2005

(87) PCT Pub. No.: WO2004/029430

PCT Pub. Date: Apr. 8, 2004

(65) Prior Publication Data

US 2006/0162688 A1    Jul. 27, 2006

(30) Foreign Application Priority Data

Sep. 25, 2002  (KR) ............. 10-2002-0058264
Apr. 30, 2003  (KR) ............. 10-2003-0027650

(51) Int. Cl.
*F02B 53/00* (2006.01)
*F02B 57/00* (2006.01)
*F02B 59/00* (2006.01)
*F01C 1/00* (2006.01)
*F04C 18/00* (2006.01)

(52) U.S. Cl. ............ 123/241; 123/43 R; 123/222; 418/264; 418/265

(58) Field of Classification Search ......... 123/241, 123/43 R, 222, 227; 418/264–265; F02B 53/00
See application file for complete search history.

(56) References Cited

U.S. PATENT DOCUMENTS

| 1,349,353 | A | * | 8/1920 | Wilber, Jr. | 123/227 |
| 1,790,256 | A | * | 1/1931 | Wright | 123/227 |
| 2,121,660 | A | * | 6/1938 | Hammers | 123/241 |
| 2,938,505 | A | * | 5/1960 | Quartier | 123/222 |
| 4,860,704 | A |   | 8/1989 | Slaughter |  |
| 5,261,365 | A | * | 11/1993 | Edwards | 123/241 |

(Continued)

FOREIGN PATENT DOCUMENTS

DE         2343909 A  *  3/1975

(Continued)

*Primary Examiner*—Thai-Ba Trieu
(74) *Attorney, Agent, or Firm*—Birch, Stewart, Kolasch & Birch, LLP

(57) ABSTRACT

A rotary engine includes pistons disposed in operating chambers of a rotary member. The pistons are guided by guiding pieces engaged in a guiding groove formed at a housing so that the operating chambers are expanded. Each of the operating chambers includes an intake/exhaust port, which is opened or closed by a shutoff valve and a shutoff plate guided along guiding grooves formed at the housing. An exhaust chamber is caved in the housing so that an explosion stroke is carried out at the rear part of the exhaust chamber, whereby a rotating force is obtained. Compressed air is supplied into the operating chambers through air-supplying channels, which are opened or closed by shutoff valves, so that gas left in the operating chambers is forcibly discharged. Consequently, introduction of lubricant through the intake/exhaust ports or leakage of pressure is prevented, and large power is obtained.

8 Claims, 8 Drawing Sheets

U.S. PATENT DOCUMENTS

| | | | | |
|---|---|---|---|---|
| 5,345,905 A | * | 9/1994 | Edwards | 123/241 |
| 5,415,141 A | | 5/1995 | McCann | |
| 6,668,767 B1 | * | 12/2003 | Sanchez Talero et al. | 123/43 R |
| 6,722,321 B1 | * | 4/2004 | Kim | 123/43 R |
| 6,776,135 B1 | * | 8/2004 | Chen et al. | 123/241 |
| 6,796,285 B1 | * | 9/2004 | Karnes | 123/241 |

FOREIGN PATENT DOCUMENTS

| | | | | |
|---|---|---|---|---|
| DE | 4225932 A1 | * | 2/1994 | |
| EP | 103985 A2 | * | 3/1984 | 418/264 |
| FR | 1255205 | * | 3/1961 | |
| FR | 2226864 A | * | 12/1974 | |
| FR | 2651 828 A1 | * | 3/1991 | |
| FR | 2744172 A1 | * | 8/1997 | |
| JP | 10-205345 A | | 8/1998 | |
| JP | 10-274050 A | | 10/1998 | |
| KR | 2002-0090286 A | | 12/2002 | |
| KR | 2003-0019058 A | | 3/2003 | |
| KR | 2004036520 A | * | 4/2004 | |
| KR | 2005017425 A | * | 2/2005 | |
| KR | 2005021748 A | * | 3/2005 | |

* cited by examiner

ROTARY ENGINE

TECHNICAL FIELD

The present invention relates to an internal combustion engine, and more particularly to a rotary engine.

Background Art

Rotary engines are disclosed in PCT/KR02/00921, which has been filed in the name of the applicant of the present application, EP 103,985, and FR 1,255,205.

In the rotary engine disclosed in each of the above patent documents, a rotary member is rotated about a rotating shaft in a cylindrical housing. When the rotary member is rotated, pistons disposed in operating chambers of the rotary member are slidably moved along the outer circumference of an elliptical guiding member disposed in the center of the rotary member so that the operating chambers are compressed and expanded by means of the pistons, respectively.

Consequently, the rotary member is rotated while being kept in whole contact with the inner wall of the cylindrical housing, whereby it is very difficult to provide an oil seal between the rotary member and the inner wall of the cylindrical housing. Even if such an oil seal is provided between the rotary member and the inner wall of the cylindrical housing, at least some of the lubricant inevitably flows into the operating chambers when the rotary member passes by the lubricating section of the housing since an intake/exhaust port formed at each of the operating chambers is exposed with the result that incomplete combustion is caused due to the inflow of the lubricant.

Also, pressure leaks through the oil seal when high pressure is generated in the operating chambers during the compression stroke, expansion stroke, and exhaust stroke of the operating chambers, which leads to loss of fuel. Furthermore, combustion in the rotary engine is not properly accomplished due to lack of the fuel. As a result, high expansion pressure is not obtainable for the supplied amount of the fuel.

Moreover, the above-described rotary engine is not provided with means for discharging the exhaust gas left after the combustion in the rotary engine. Consequently, at least some of the exhaust gas is left in the operating chambers. Also, the rotary engine obtains power simply by means of sliding movement of the tail parts of the pistons from the upper dead center of the guiding member to the lower dead center of the guiding member when the combustion in the rotary engine is performed. Consequently, large power cannot be obtained by means of the conventional rotary engine.

DISCLOSURE OF THE INVENTION

Therefore, the present invention has been made in view of the above problems, and it is an object of the present invention to provide a rotary engine that is capable of preventing leakage of oil or pressure, completely discharging exhaust gas, and performing explosion strokes at the rear of a partitioned exhaust chamber, whereby large power can be obtained.

In accordance with the present invention, the above and other objects can be accomplished by the provision of a rotary engine comprising: a cylindrical housing having an intake chamber and an exhaust chamber formed at the inner wall thereof, the intake and exhaust chambers being caved in the inner wall of the housing and surrounded by oil seals; and a rotary member rotated in the housing, the rotary member including operating chambers having pistons disposed therein, wherein the operating chambers have intake/exhaust ports, respectively, which are opened or closed by means of shutoff valves and shutoff plates so that the intake/exhaust ports are closed by means of the shutoff valves and the shutoff plates after fuel is supplied, compression is accomplished by means of the pistons, the shutoff valves and the shutoff plates are opened when they reach the ignition section, and the exhaust chamber is partitioned by means of the opened shutoff plates with the result that combustion occurs in the rear part of the exhaust chamber so that power is generated until it reaches exhaust ports, and wherein compressed air is supplied into the operating chambers through air-supplying channels, which are opened or closed by means of shutoff valves and communicate with the operating chambers, when an exhaust stroke is carried out, whereby the exhaust gas is completely discharged.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
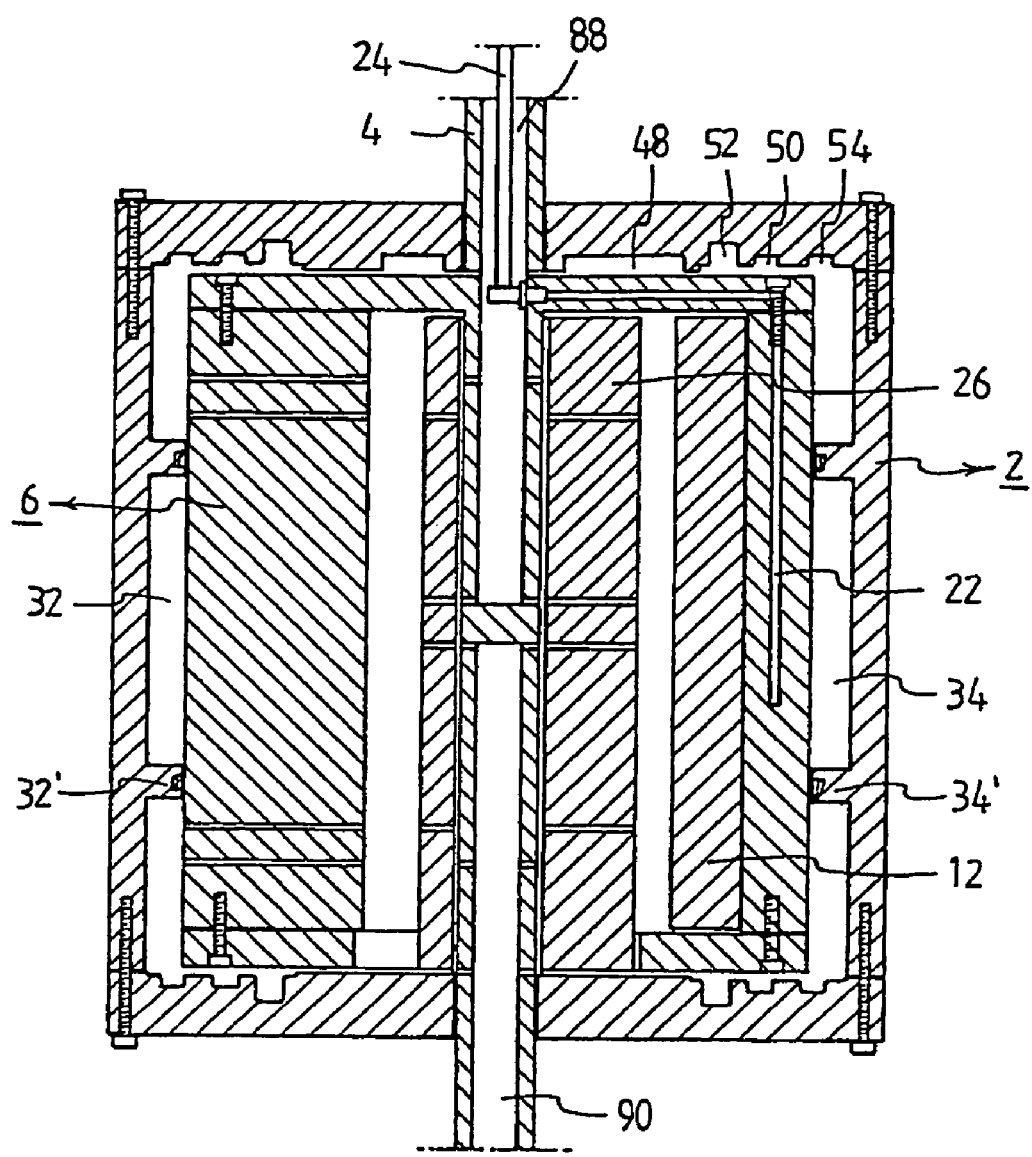
FIG. 1 is a longitudinal sectional view showing a rotary engine according to a first preferred embodiment of the present invention.
Figure 2:
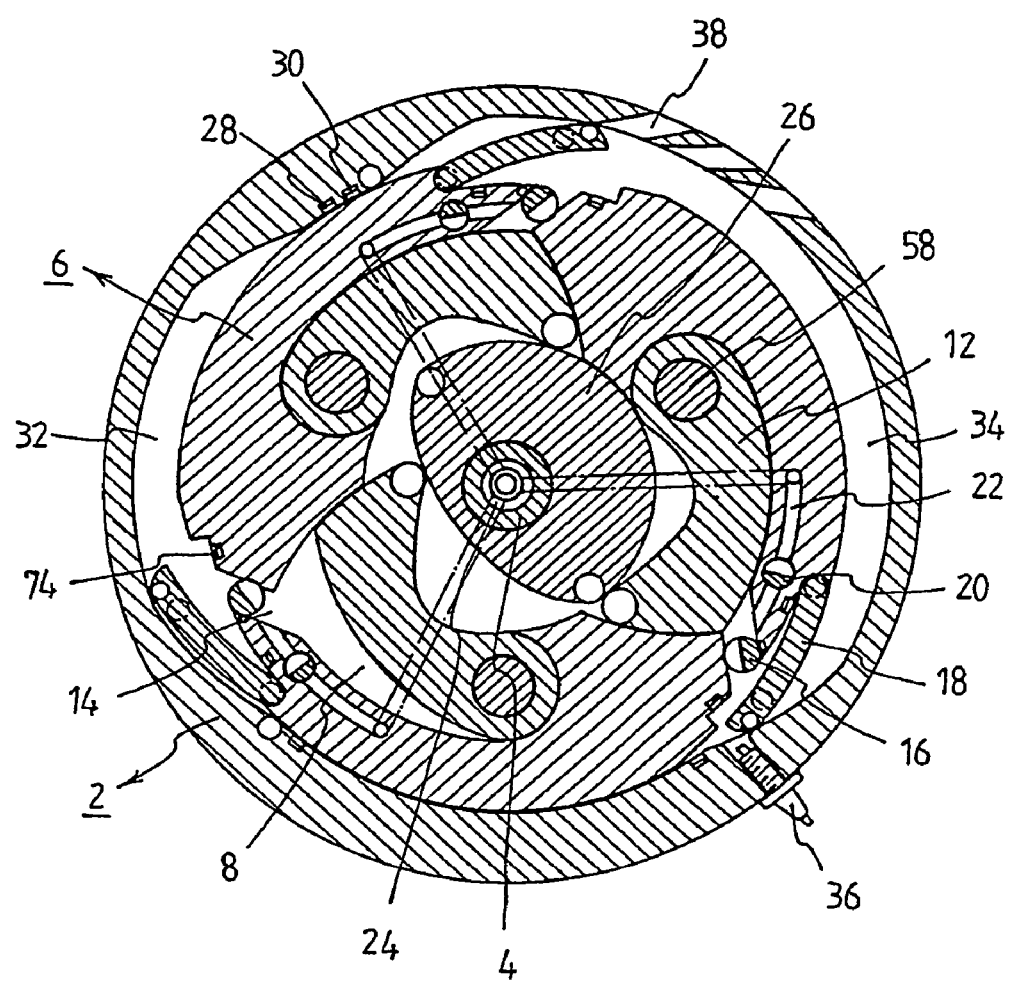
FIG. 2 is a cross-sectional view showing the rotary engine according to the first preferred embodiment of the present invention.

FIGS. 1 and 2 respectively show, in section, a rotary engine according to a first preferred embodiment of the present invention. As shown in FIGS. 1 and 2, the rotary engine of the present invention includes a rotary member 6 disposed in a cylindrical housing 2 in such a manner that the rotary member 6 is rotated along with a rotating shaft 4. The rotary member 6 is provided with a plurality of operating chambers 8, in which pistons 12 are disposed, respectively. The pistons 12 are guided by means of guiding pieces 10, respectively. Each of the operating chambers 8 is provided with an intake/exhaust port 14, at which a shutoff valve 16 and a shutoff plate 18 are disposed. In each of the operating chambers 8 is formed an air-supplying channel 22, which is opened/closed by means of another shutoff valve 20 mounted in the air-supplying channel 22. To each of the operating chambers 8 is connected an air-supplying conduit 24 through the air-supplying channel 22. At the center of the rotary member 6 is disposed a guiding member 26, which is protruded from the housing 2.

The housing 2 comprises a housing body and housing covers fixed to the housing body by means of bolts.

In the housing body of the housing 2 are formed an intake chamber 32 and an exhaust chamber 34, which are surrounded by oil seals 28 and 30, respectively. The intake chamber 32 and the exhaust chamber 34 are caved in the inner wall of the housing body of the housing 2. At the inlet of the exhaust chamber 34 is disposed an ignition plug 36 or a fuel injector, which is selected depending upon which kind of engine is to be provided. At the outlet of the exhaust chamber 34 are disposed exhaust ports 38.

Specifically, the ignition plug 36 is disposed at the inlet of the exhaust chamber 34 when a gasoline engine is to be provided. On the other hand, the fuel injector is disposed at the inlet of the exhaust chamber 34 when a diesel engine is to be provided. In this case, the fuel injector is easily disposed at the inlet of the exhaust chamber 34 simply by changing the design of the engine.

It should be noted, however, that the ignition plug or the fuel injector is not necessarily mounted in the housing 2. Preferably, the ignition plug or the fuel injector is disposed at the intake/exhaust port 14 of each of the operating chamber 8 of the rotary member 6.

Figure 3:
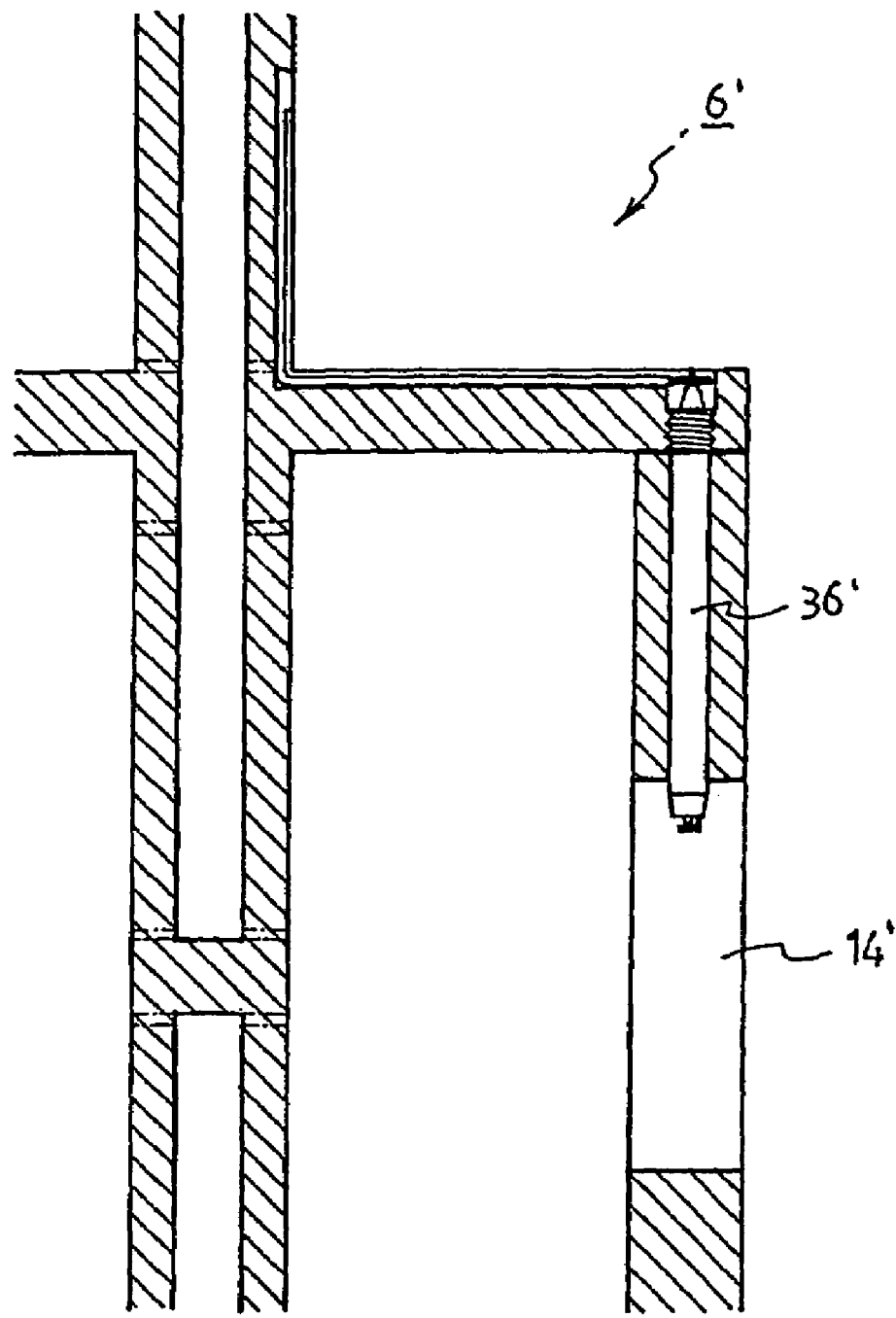
FIG. 3 is a partial longitudinal sectional view showing a rotary engine according to a second preferred embodiment of the present invention.

FIG. 3 is a partial longitudinal sectional view showing a rotary engine according to a second preferred embodiment of the present invention. In the rotary engine of the present invention as shown in FIG. 3, an ignition plug 36' or a fuel injector is mounted in a rotary member 6'. The ignition parts of the ignition plug 36 or the injection parts of the fuel injector are disposed in intake/exhaust ports 14', respectively. A fuel-supplying conduit or cable may be disposed through a groove formed at the rotary member 6'.

The intake chamber 32 and the exhaust chamber 34, which are formed in the housing body of the housing 2, are spatially restricted by means of partitions 32' and 34' protruded inwardly from the inner wall of the housing body of the housing 2 so that a lubricating operation is carried out at other spaces excluding the restricted spaces of the intake chamber 32 and the exhaust chamber 34. The intake chamber 32 may be connected to an external fuel-pressurizing unit so that the fuel can be supplied into the housing body 2 of the housing while being pressurized. Alternatively, a turbine-type fuel-pressurizing unit may be mounted to the rotating shaft so that the fuel can be supplied while being pressurized.

Figure 4:
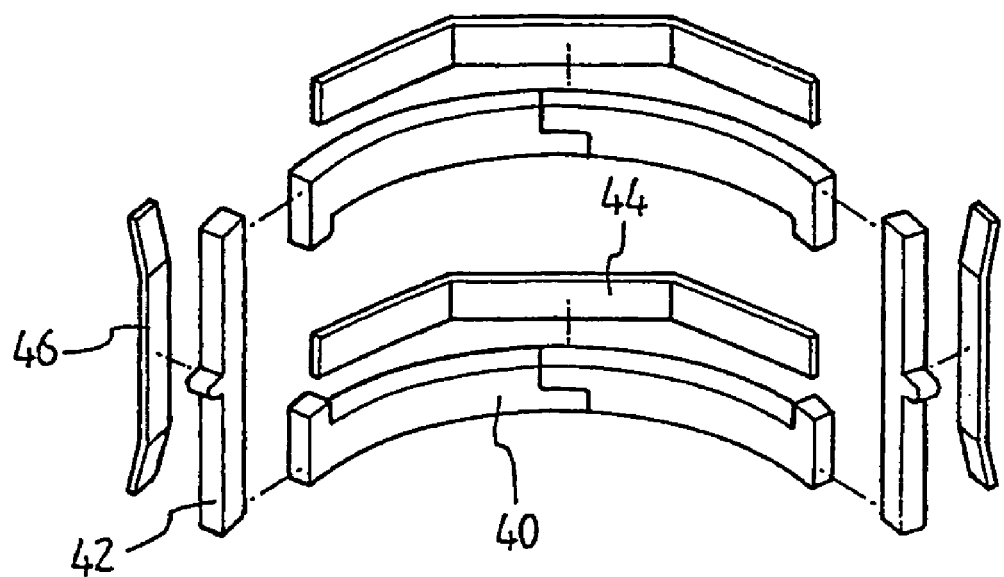
FIG. 4 is an exploded perspective view showing oil seals used in the present invention.

FIG. 4 is an exploded perspective view showing oil seals used in the present invention. As shown in FIG. 4, the oil seal 28, which surrounds the intake chamber 32, comprises a sealing part 40 and a plate spring 44 for resiliently supporting the sealing part 40. Similarly, the oil seal 30, which also surrounds the exhaust chamber 34, comprises a sealing part 42 and a plate spring 46 for resiliently supporting the sealing part 42. The sealing parts 40 and 42 of the oil seals 28 and 30 are separable from the housing body of the housing 2 at both sides thereof so that the oil seals 28 and 30 are adaptable when they contact the shutoff plates 18.

It should be noted, however, that the present invention is not limited by the above-described structures of oil seals 28 and 30, and all kinds of seals, which serve as oil seals required for the present invention, can be used unlimitedly.

The upper and lower housing covers of the housing 2 are provided at the inner sides thereof with guide grooves 48, 50, 52 and 54 for guiding the guiding pieces 10, shutoff valves 16 and 20, and the shutoff plates 18.

Figure 5:
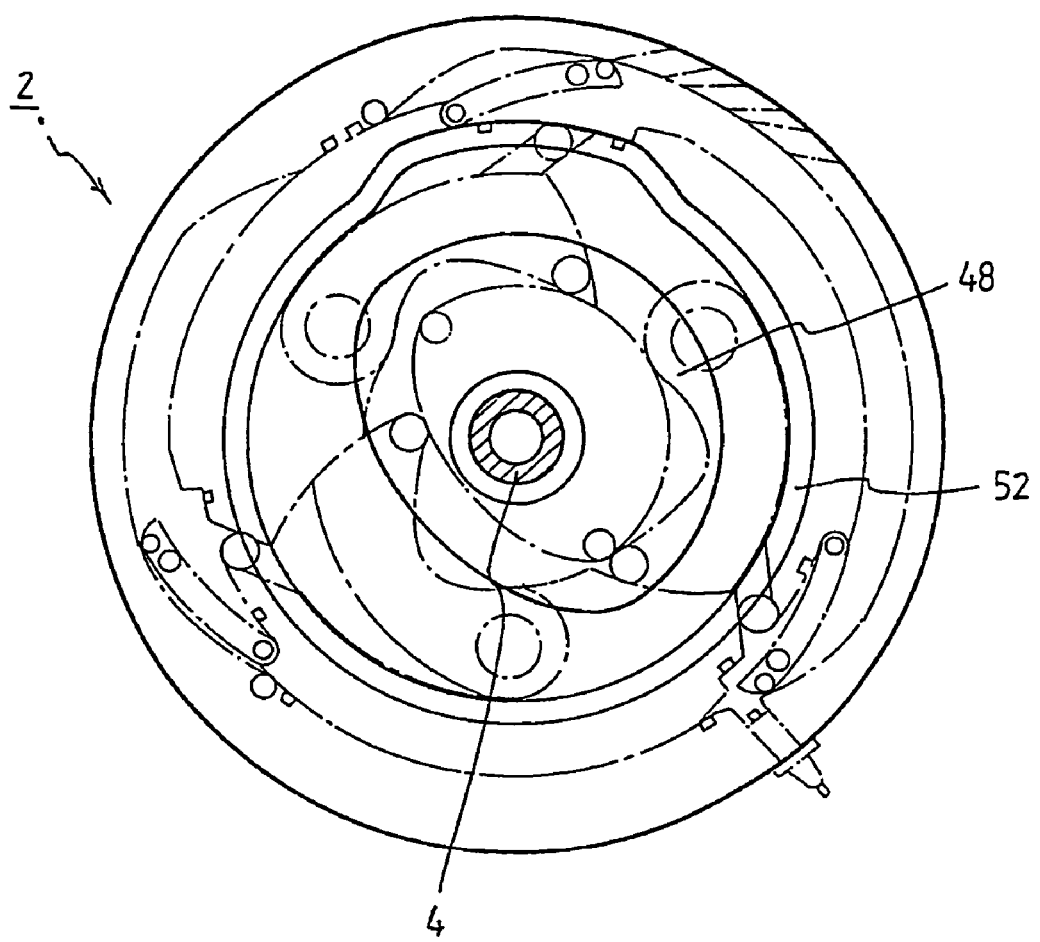
FIG. 5 is a view of a housing cover of the present invention showing some of the guide grooves formed at the housing cover.

FIG. 5 shows the guide grooves for guiding the guiding pieces 10 of the pistons and the shutoff valves, which are operated for controlling the supply of air. As shown in FIG. 5, the guide groove 48, which guides the guiding pieces 10 of the pistons 12, is formed such that it has an elliptical part including an intake section and a semicircular part for extending the upper dead center of the elliptical part. The guide groove 52 for guiding the shutoff valves 20 is formed such that it has an opened section and an isolated section, which are partitioned on the basis of the difference of the diameters from the rotating center of the rotary member 6.

Figure 6:
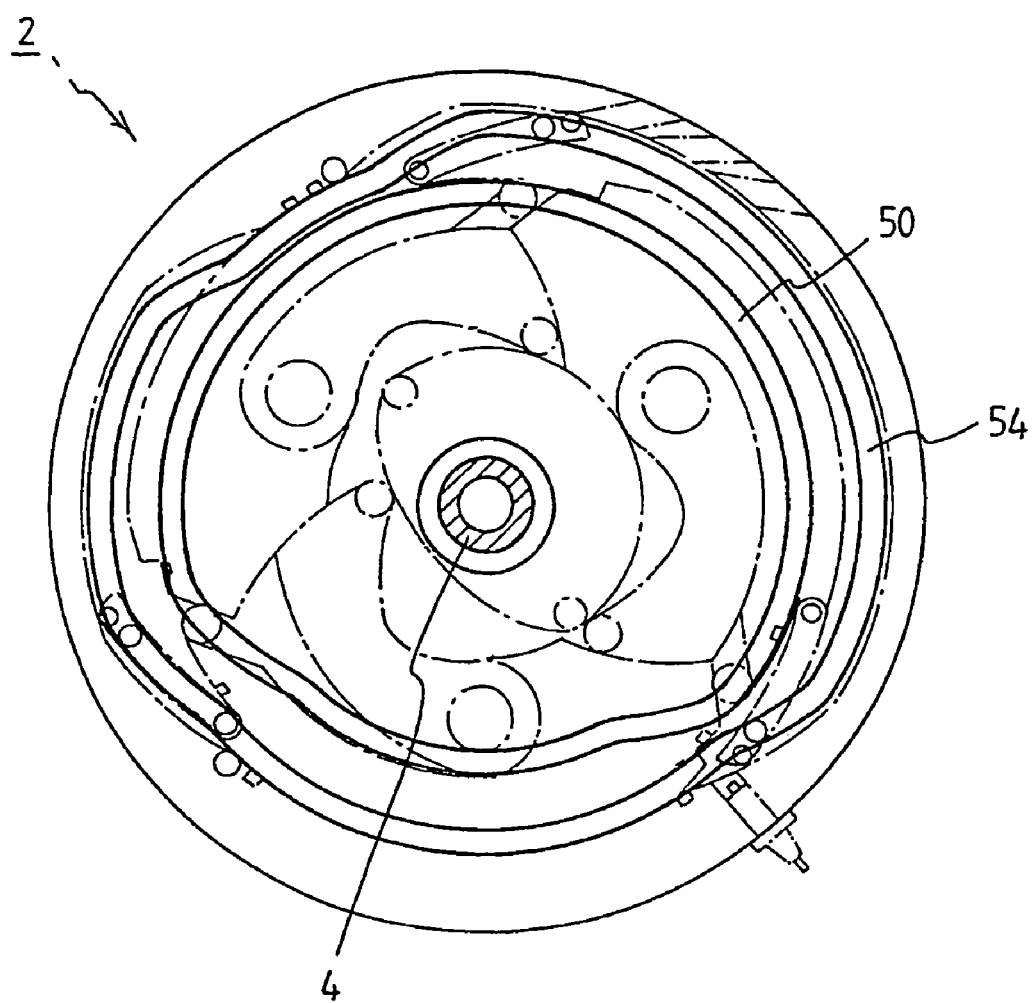
FIG. 6 is a view of another housing cover of the present invention showing the other guide grooves formed at the housing cover.

FIG. 6 shows the guide grooves for guiding the shutoff valves, which are operated for opening or closing the operating chambers, and the shutoff plates. As shown in FIG. 6, the guide grooves 50 and 54 for guiding the shutoff valves 16 and the shutoff plates 18, respectively, are formed such that each of them has an opened section and an isolated section, which are partitioned on the basis of the difference of the diameters from the rotating center of the rotary member 6.

The guiding groove 50 for guiding the shutoff valves 16 may be partially overlapped with the guiding groove 52 for guiding the shutoff valves 20. In this case, the guiding groove 52 may be formed such that the depth of the guiding groove 52 is larger than that of the guiding groove 50, whereby the partial overlapping between the guiding groove 50 and the guiding groove 52 is avoided.

Figure 7:
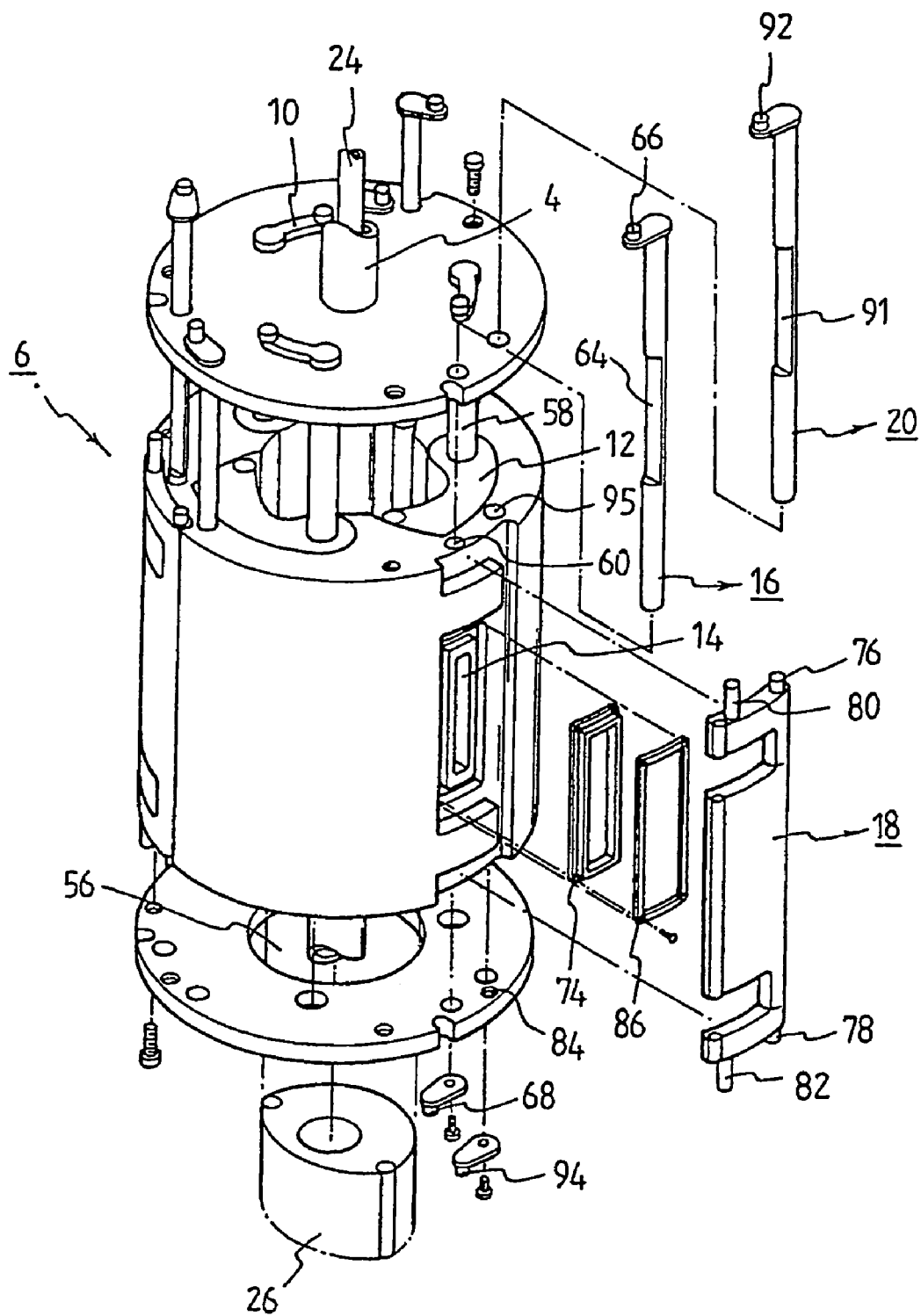
FIG. 7 is an exploded perspective view showing a rotary member of the present invention.

FIG. 7 is an exploded perspective view showing the rotary member of the present invention. The rotary member 6 comprises a body and covers fixed to the body by means of bolts. The rotating shaft 4 is integrally formed to one of the covers, i.e., the upper cover. At the other cover, i.e., the lower cover, is formed a through-hole 56, through which the guiding member 26 is inserted.

In the body of the rotary member 6 are formed one or more operating chambers 8. Each of the operating chambers 8 is provided with the intake/exhaust port 14, through which the fuel is supplied and the exhaust gas is discharged.

In each of the operating chambers 8 is disposed the piston 12. The piston 12 is provided at the head part thereof with a shaft rod 58, about which the piston 12 is rotated. The tail part of the piston 12 makes sliding contact with the outer circumference of the guiding member 26 such that the guiding member 26 pushes the piston 12 toward the intake/exhaust port 14 when the piston 12 passes by the upper dead center and the lower dead center so that the operating chamber 8 is compressed. The operating chamber 12 is expanded when the piston 12 is returned. In this way, the above-mentioned compression and expansion strokes of the piston 12 are sequentially accomplished.

The guiding piece 10 of each of the pistons 12 is connected to the end of the shaft rod 58 protruded outwardly from the upper cover. The guiding piece 10 is engaged in the guiding groove 48 of the housing 2 through a guiding roller provided at the end of the guiding piece 10.

The intake/exhaust port 14 of each of the operating chambers 8 communicates with an operating hole 60 formed through the body of the rotary member 6. In the operating hole 60 is disposed the shutoff valve 16. The shutoff valve 16 is lubricated by means of a lubricant-supplying block 62.

The shutoff valve 16 is formed in the shape of a rod. The shutoff valve 16 is provided at the part thereof disposed in the intake/exhaust port 14 with a passage 64. At both ends of the shutoff valve 16 are formed guiding rods 66 and 68, respectively. The guiding rods 66 and 68 are disposed such that they are eccentric to each other. When assembled, the guiding rods 66 and 68 are engaged in the guiding groove 50 formed at the housing 2 so that the opening and closing operations of the guiding rods 66 and 68 are carried out while being guided along the guiding groove 50.

Figure 8:
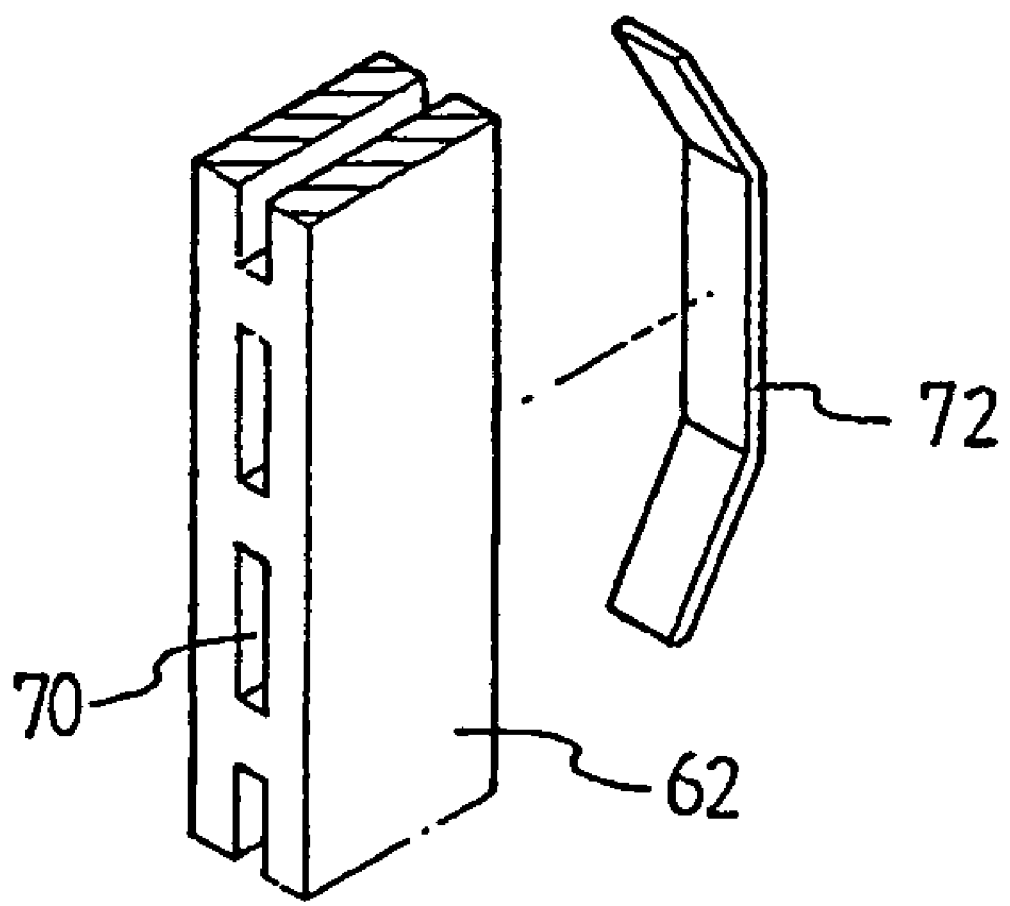
FIG. 8 is a partial exploded perspective view showing a lubricant-supplying block used in the present invention.

FIG. 8 is a partial exploded perspective view showing the lubricant-supplying block 62, which is used to lubricate the shutoff valve 16. As shown in FIG. 8, the lubricant-supplying block 62 has a plurality of supply channels 70 formed therethrough. The lubricant-supplying block 62 is resiliently supported by means of a plate spring 72 disposed at the rear of the lubricant-supplying block 62 so that the lubricant-supplying block 62 is disposed adjacent to the shutoff valve 16. The lubricant-supplying block 62 is inserted through the operating chamber longitudinally formed at one side of the operating hole 60 of the shutoff valve 16.

The shutoff plates 18 of the rotary member 6 are disposed in operating grooves formed on the body of the rotary member 6, respectively. The intake/exhaust ports 14 are disposed in the corresponding operating grooves. Around the intake/exhaust ports 14 are arranged oil seals 74 for sealing the intake/exhaust ports 14, respectively.

Each of the shutoff plates 18 is provided at the upper and lower parts thereof in the rotating direction of the rotary member with shaft rods 76 and 78, respectively. Each of the shutoff plates 18 is provided at the upper and lower parts thereof in the direction opposite to the rotating direction of the rotary member with guide rods 80 and 82, respectively. To the tail part of each of the shutoff plates 18 is fixed a roller, by means of which the shutoff plates 18 makes smooth contact with the inner wall of the housing 2.

When assembled, the shaft rods 76 and 78 of the shutoff plates 18 are engaged in shaft holes 84 formed at the covers of the rotary member so that the shutoff plates 18 are rotated about the shaft rods 76 and 78. The guide rods 80 and 82 of the shutoff plates 18 are engaged in the guide groove 54 formed at the housing 2 so that the shutoff plates 18 are opened or closed be means of the guidance of the guide groove 54.

Each of the oil seals 74 is fixed to the body of the rotary member 6 through the shaft holes 86 formed at the covers of the rotary member 6 by means of bolts so that the oil seals 74 are not separated from the rotary member 6 when the shutoff plates 18 are opened.

In the rotating shaft 4 are formed a lubricant-supplying channel 88 and a lubricant-discharging channel 90. The lubricant-supplying channel 88 has a plurality of lubricant-supplying holes, and the lubricant-discharging channel 90 also has a plurality of lubricant-discharging holes so that lubricant is supplied between the housing 2 and the rotary member 6, between the rotary member 6 and the pistons 12, and between the pistons 6 and the guiding member 26.

Between the lubricant-supplying channel 88 formed at the rotating shaft 4 and the intake/exhaust ports 14 formed at the operating chambers 8 are formed the air-supplying channels 22, respectively. To the inlet part of each of the air-supplying channels 22 is connected the air-supplying conduit 24, and at the outlet part of each of the air-supplying channels 22 is disposed the shutoff valve 20 so that air is supplied to the operating chambers 8 when the gas is exhausted.

The shutoff valve 20 is also formed in the shape of a rod. The shutoff valve 20 is provided at the center thereof with a passage 91. The shutoff valve 20 is provided at both ends thereof with eccentric guide rods 92 and 94, respectively. The shutoff valve 20 is inserted in an operating hole 95, which passes through the air-supplying channel 22. The eccentric guide rods 92 and 94 of the shutoff valve 20 are engaged in the guide groove 52 so that the shutoff valve 20 is opened or closed.

The guiding member 26 is protruded from the lower cover of the housing 2. The guiding member 26 includes an elliptical part having the upper dead center and the lower dead center at one side thereof, which corresponds to an intake section, and a semicircular part for extending the upper dead center at the other side thereof, which corresponds to an exhaust section. At the center of the guiding member 26 is longitudinally formed the rotating shaft 4.

In the rotary engine of the present invention, the tail parts of the pistons 12 make sliding contact with the elliptical part of the guiding member 26 when the pistons 12 pass by the intake chamber 32 as shown in FIG. 2. Consequently, the operating chambers 8 are maximally expanded. The guiding rods 66 and 68 of the shutoff valves 16 and the guide rods 80 and 82 of the shutoff plates 18 pass by the opened section of the guide grooves 50 and 54 formed at the housing 2 so that the intake stroke is carried out.

The guiding pieces 10 connected to the corresponding shaft rods 58 of the pistons 12 are engaged in the guide groove 48 formed at the housing 2 so that the operating chambers 8 are maximally expanded in the intake section.

At this time, the shutoff valves 20 of the air-supplying channels 22 are closed when they pass by the isolated section of the guide groove 52, the closed state of the shutoff valves 20 is maintained until the gas is exhausted.

When the tail parts of the pistons 12 reach the lower dead center of the guiding member 26, and thus the maximum intake operation is accomplished, the guiding rods 66 and 68 of the shutoff valves 16 and the guide rods 80 and 82 of the shutoff plates 18 pass by the opened section of the guide grooves 50 and 54, and approach the isolated section of the guide grooves 50 and 54. Consequently, the intake/exhaust ports 14 of the operating chambers 8 are closed, and the closed state of the intake/exhaust ports 14 is maintained until the explosion is carried out.

At this time, the tail parts of the pistons 12 pass by the lower dead center and move to the upper dead center so that the compression stroke is carried out.

When the tail parts of the pistons 12 reach the upper dead center of the guiding member 26, the maximum compression is accomplished. This maximum compression is maintained when they pass by the upper dead center and continuously pass by the semicircular part extending the upper dead center. When the intake/exhaust ports 14 of the operating chambers 8 enter the exhaust chamber 34 under the above-mentioned condition, the guiding rods 66 and 68 of the shutoff valves 16 and the guide rods 80 and 82 of the shutoff plates 18 enter the opened sections of the guiding grooves 50 and 54 so that the operating chambers 8 are opened. When the operating chambers 8 are opened, the ignition plug 36 mounted at the inlet part of the exhaust chamber 34 is ignited so that the expansion stroke is carried out in the case of a gasoline engine. On the other hand, air is compressed, and then fuel is injected by means of the fuel injector so that the expansion stoke is carried out in the case of a diesel engine.

As described above, the rotary engine according to the second preferred embodiment of the present invention is shown in FIG. 3. When the ignition plug 36' or the fuel injector is mounted in the intake/exhaust ports 14' of the rotary member 6', the flame propagation distance is shortened or the explosion is stably carried out under the high pressure as compared to the case in that the ignition plug 36' or the fuel injector is mounted in the housing. Consequently, it is preferable that the ignition plug 36' or the fuel injector is mounted adjacent to each of the operating chambers, if possible.

When the expansion stroke is carried out, the shutoff plates 18 are rotated about the shaft rods 76 and 78, and thus the tail parts of the shutoff plates 18 make sliding contact with the inner wall of the exhaust chamber 34 so that the exhaust chamber 34 is partitioned. Consequently, the expanded exhaust gas is discharged in the direction opposite to the rotating direction of the rotary member 6 with the result that there is generated a strong propulsive force, by which the rotary member 6 is rotated in the housing 2.

This expansion stroke is continued until the tail parts of the shutoff plates 18 pass by the exhaust ports 38. After the tail parts of the shutoff plates 18 pass by the exhaust ports 38, the exhaust operation is carried out through the exhaust ports 38.

When the exhaust operation is carried out, the guide rods 92 and 94 provided at the shutoff valves 20 in the air-supplying channel 22 pass by the opened section of the guide groove 52 of the housing 2 with the result that the air-supplying channel 22 is opened. Compressed air is supplied through the opened air-supplying channel 22 so that the burned gas left in the operating chambers 8 is forcibly discharged. After the gas is exhausted, the guide rods 92 and 94 of the shutoff valves 20 enter the isolated section of the groove 52, by which the air-supplying channel 2 is closed.

When the intake/exhaust ports 14 of the rotary members 6 pass by the exhaust ports 38 of the exhaust chamber 34, the guide rods 80 and 82 of the shutoff plates 18 enter the isolated section of the guide groove 54 so that the intake/exhaust ports 14 are closed. When the intake/exhaust ports 14 of the rotary members 6 enter the intake chamber 32, the shutoff plates 18 are opened so that the intake stroke is carried out.

When the above-mentioned intake and exhaust strokes are repeated, lubricating operations are carried out by means of the lubricant-supplying channel 88 having the plurality of lubricant-supplying holes and the lubricant-discharging channel 90 having the plurality of lubricant-discharging holes, all of which are formed in the rotating shaft 4. When the lubricating operations are carried out, the oil seals 26 and 28 surrounding the intake chamber 32 and the exhaust chamber 34 of the housing 2 make tight contact with the outer surface of the rotary member 6 by means of the elasticity of the plate springs 44 and 46, whereby leakage of oil is effectively prevented.

Specifically, the rotary member 6 makes contact with the oil seals 28 and 30 formed at the intake chamber 32 and the exhaust chamber 34 of the housing 2 in such a manner that the oil seals 28 and 30 surround the intake chamber 32 and the exhaust chamber 34 of the housing 2, whereby the intake chamber and the exhaust chamber are partitioned from each other while they are tightly sealed. Consequently, other sections excluding the portioned sections are smoothly lubricated by means of the lubricant, and introduction of the lubricant into the intake chamber 32 and the exhaust chamber 34 is prevented.

Also, the intake/exhaust ports 14 of the operating chambers 8 are doubly closed by means of the shutoff valves 16 and the shutoff plates 18, and between the rotary member 6 and the shutoff valves 18 are provided the oil seals 74. Consequently, leakage of the oil is effectively prevented, and the frictional force of the shutoff plates 18 due to the compressed fuel is reduced.

INDUSTRIAL APPLICABILITY

As apparent from the above description, introduction of oil into an intake chamber and an exhaust chamber formed at a housing is effectively prevented by means of oil seals surrounding the intake chamber and the exhaust chamber, and intake/exhaust ports of operating chambers are doubly closed by means of shutoff valves and shutoff plates, whereby incomplete combustion of fuel due to introduction of lubricant is prevented. Also, loss of fuel and expanded pressure is eliminated when compression and expansion strokes are carried out, and the compressed air is supplied to the operating chambers so that burned gas left in the operating chambers is forcibly discharged, whereby desired power can be obtained.

Furthermore, the tail parts of the shutoff plates make sliding contact with the inner wall of the exhaust chamber so that the exhaust chamber is partitioned. As a result, explosion is carried out at the rear part of the exhaust chamber to obtain a rotating force of a rotary member. Consequently, the present invention has an effect of generating greater power.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A rotary engine comprising:
   a cylindrical housing having an intake chamber and an exhaust chamber formed at the inner wall thereof, the intake and exhaust chambers being caved in the inner wall of the housing;
   a guiding member disposed at the center of the housing, the guiding member being formed in a semi-elliptical shape at intake and compression sections and in a semicircular shape at an exhaust section;
   a rotary member disposed in the housing such that the rotary member is rotatable along with a rotating shaft;
   pistons disposed in a plurality of operating chambers formed at the rotary member such that the pistons are rotatable about shaft rods (58), respectively, each of the pistons having a tail part contacting the outer circumference of the guiding member;
   shutoff valves engaged in a guide groove formed at the housing through guide rods inserted through intake/exhaust ports formed at the operating chambers of the rotary member; and
   an ignition plug disposed at the inlet of the exhaust chamber of the housing or at the intake/exhaust ports of the rotary member; and shutoff plates rotatably disposed at the outsides of the intake/exhaust ports of the rotary member, respectively, the shutoff plates being engaged in the guide groove of the housing through guide rods.

2. The engine as set forth in claim 1, further comprising oil seals surrounding the intake chamber and the exhaust chamber of the housing, respectively.

3. The engine as set forth in claim 2, wherein the oil seals comprise sealing parts and plate springs, both sides of the sealing parts being separable from the housing body of the housing.

4. The engine as set forth in claim 1, further comprising oil seals arranged around the intake/exhaust ports formed at the operating chambers of the rotary member, respectively.

5. The engine as set forth in claim 1, wherein each of the shutoff valves for opening or closing the intake/exhaust ports of the rotary member comprises:
   a rod-shaped body;
   a passage formed at one side of the rod-shaped body; and
   guide rods eccentrically formed at both ends of the rod-shaped body.

6. The engine as set forth in claim 1, wherein the pistons are constructed such that guide rollers of guiding pieces connected to shaft rods of the pistons contact the sidewall of an elliptical guide groove formed at the housing.

7. The engine as set forth in claim 1, wherein the operating chambers of the rotary member have air-supplying channels that are opened or closed by shutoff valves, respectively.

8. The engine as set forth in claim 7, wherein each of the shutoff valves for opening or closing the air-supplying channels comprises:
   a passage formed at one side of a rod-shaped body thereof; and
   guide rods eccentrically formed at both ends of the rod-shaped body, the guide rods being engaged in a guide groove formed at the housing.

* * * * *